US010285060B2

(12) United States Patent
Nair et al.

(10) Patent No.: US 10,285,060 B2
(45) Date of Patent: May 7, 2019

(54) PREVENTING ATTACKS FROM FALSE BASE STATIONS

(71) Applicant: Alcatel-Lucent USA Inc., Murray Hill, NJ (US)

(72) Inventors: Suresh P Nair, Whippany, NJ (US); Semyon B Mizikovsky, Morganville, NJ (US)

(*) Notice: Subject to any disclaimer, the term of this patent is extended or adjusted under 35 U.S.C. 154(b) by 216 days.

(21) Appl. No.: 14/928,098

(22) Filed: Oct. 30, 2015

(65) Prior Publication Data

US 2017/0127285 A1 May 4, 2017

(51) Int. Cl.
H04L 29/06 (2006.01)
H04W 12/12 (2009.01)
(Continued)

(52) U.S. Cl.
CPC ......... *H04W 12/12* (2013.01); *H04L 63/0254* (2013.01); *H04L 63/1466* (2013.01);
(Continued)

(58) Field of Classification Search
CPC ..... H04W 76/02; H04W 28/02; H04W 76/27; H04W 12/12; H04W 36/08; H04W 88/08;
(Continued)

(56) References Cited

U.S. PATENT DOCUMENTS 8,565,764 B2   10/2013   Pudney et al.
8,706,111 B2   4/2014    Cheng
(Continued)

FOREIGN PATENT DOCUMENTS

EP    2209330 A2      7/2010
EP    2624642 A1      8/2013
WO    2011088067 A1   7/2011

OTHER PUBLICATIONS

Securing the User Equipment (UE) in LTE Networks by Detecting Fake Base Stations, by Mohammed Arozullah Jan. 2015 (Year: 2015).*

(Continued)

*Primary Examiner* — Alexander Lagor
*Assistant Examiner* — Vu V Tran
(74) *Attorney, Agent, or Firm* — Capitol Patent & Trademark Law Firm, PLLC

(57) ABSTRACT

Embodiments provide a user equipment (UE) device that includes a memory and a processor configured to execute instructions stored in said memory. The processor is configured by the instructions to receive a first evolved packet system (EPS) mobility management (EMM) attach reject message in response to an attempt to attach to a first eNode B (eNB) of a radio access network (RAN). If the attach reject message includes an Evolved Packet System mobility management (EMM) error code, the processor directs an attach request to a second, confirming eNB. The processor may be further configured by the instructions to receive a second attach reject message from the second eNB and enter a lock state only the condition that the second attach reject message also includes an EMM error code, optionally the same EMM error code received in the first attach reject message.

16 Claims, 6 Drawing Sheets

(51) Int. Cl.
*H04W 8/02* (2009.01)
*H04W 60/00* (2009.01)
*H04W 76/30* (2018.01)
*H04W 88/08* (2009.01)
*H04W 88/02* (2009.01)
*H04W 36/08* (2009.01)
*H04W 48/02* (2009.01)
*H04W 48/20* (2009.01)
*H04W 84/04* (2009.01)

(52) U.S. Cl.
CPC .............. *H04W 8/02* (2013.01); *H04W 60/00* (2013.01); *H04W 76/30* (2018.02); *H04W 36/08* (2013.01); *H04W 48/02* (2013.01); *H04W 48/20* (2013.01); *H04W 84/042* (2013.01); *H04W 88/02* (2013.01); *H04W 88/08* (2013.01)

(58) Field of Classification Search
CPC ..... H04W 76/30; H04W 48/02; H04W 48/20; H04L 63/1466; H04L 63/0254
See application file for complete search history.

(56) References Cited

U.S. PATENT DOCUMENTS

| | | | |
|---|---|---|---|
| 8,934,334 | B2 | 1/2015 | Kim et al. |
| 2004/0014422 | A1* | 1/2004 | Kallio ................... H04L 63/08 455/41.1 |
| 2004/0085351 | A1* | 5/2004 | Tokkonen ............. G06F 3/0488 715/741 |
| 2010/0267373 | A1* | 10/2010 | Engstrom ............ H04J 11/0093 455/415 |
| 2015/0117184 | A1* | 4/2015 | Youtz ................... H04W 76/18 370/230 |
| 2016/0212623 | A1* | 7/2016 | Cote .................... H04W 12/12 |
| 2016/0309332 | A1* | 10/2016 | Norrman .............. H04W 12/12 |
| 2016/0381545 | A1* | 12/2016 | Wang ................... H04W 12/12 455/434 |

OTHER PUBLICATIONS

3rd Generation Partnership Project; Technical Specification Group Core Network and Terminals; Non-Access-Stratum (NAS) protocol for Evolved Packet System (EPS); Stage 3 (Release 13), 3GPP TS 24.301, v13.3.0 (Sep. 2015).
PCT/US2016/059462 Notification of Transmittal of the International Search Report and the Written Opinion of the International Searching Authority, or the Declaration dated Jan. 30, 2017.

* cited by examiner

PREVENTING ATTACKS FROM FALSE BASE STATIONS

TECHNICAL FIELD

The present invention relates generally to the field of wireless communications, and, more particularly, but not exclusively, to methods and apparatus for authentication and key negotiation of mobile telephonic devices.

BACKGROUND

This section introduces aspects that may be helpful to facilitate a better understanding of the inventions. Accordingly, the statements of this section are to be read in this light and are not to be understood as admissions about what is in the prior art or what is not in the prior art. Any techniques or schemes described herein as existing or possible are presented as background for the present invention, but no admission is made thereby that these techniques and schemes were heretofore commercialized, or known to others besides the inventors.

In a UMTS Terrestrial Radio Access Network (UTRAN) network, a user equipment (UE) device typically attaches to an eNode B (eNB) access node. In the attachment process, described by, e.g. 3GPP TS 24.301, the UE sends an attach request message to the eNB. The eNB may return a message indicating the request is granted, or in some circumstances may return a message rejecting the request, the message including an Evolved Packet System (EPS) mobility management (EMM) cause value.

SUMMARY

The inventors disclose various apparatus and methods that may be beneficially applied to, e.g., mobile communications networks, e.g. communications networks based on the 3GPP long-term evolution (LTE) suite of standards. While such embodiments may be expected to provide improvements in performance and/or security of such apparatus and methods, no particular result is a requirement of the present invention unless explicitly recited in a particular claim.

One embodiment provides an apparatus, e.g. a user equipment (UE) device such as a mobile handset, including a processor, and a memory coupled to the processor. The processor is configured to execute instructions stored in the memory that when executed configure the processor to perform various steps, e.g. to improve security by protecting against a counterfeit eNB. The processor is configured by the instructions to receive an EMM attach reject message in response to an attempt to attach to a radio access network (RAN). On the condition that the attach reject message includes an EMM error code, the processor is further configured to direct an attach request to a confirming eNB.

In some embodiments, the processor is further configured to receive an attach reject message from the confirming eNode B. On the condition that the attach reject message includes an EMM error code, the processor is configured to enter a lock state. In some embodiments, the EMM error code includes one of EMM cause values #3 (Illegal UE), #6 (Illegal ME) and #8 (EPS services and non-EPS services not allowed). In some embodiments, the processor is further configured to, after receiving the EMM error code, block access to an initial eNB from which the EMM error code was received.

In some embodiments, the processor is further configured to receive an attach reject message from the confirming eNB, and on the condition that the attach reject message includes an EMM error code, stop sending attach requests to all eNBs in a first tracking area that includes an initial eNB from which the EMM error code was received. In some embodiments, the confirming eNB is a first confirming eNB, and the processor is further configured to, after stopping sending messages to all eNBs in the first tracking area, direct an attach request to a second confirming eNB.

In some embodiments, the confirming eNB is a first confirming eNB and the processor is further configured to, on the condition that the first confirming eNB is in a same tracking area as the initial eNB, direct an attach request to a second confirming eNB. The processor is further configured to enter a lock state on the condition that an attach reject message from the second confirming eNB includes an EMM error code. In some such embodiments, the processor is further configured to enter the locked state only on the condition that the second confirming eNB is in a second different tracking area than a tracking area of an initial eNB from which the EMM error code was received.

Other embodiments include configuring a processor, e.g. of a UE device, to communicate with a memory. The processor is further configured to execute instructions on the memory that, when executed, configure the processor to implement one or more of the embodiments described above.

Other embodiments include configuring a memory, e.g. of a UE device, to communicate locally with a processor. The memory is configured to provide to the processor instructions that, when executed by the processor, configure the processor to implement one or more of the embodiments described above.

BRIEF DESCRIPTION OF THE DRAWINGS

A more complete understanding of the present invention may be obtained by reference to the following detailed description when taken in conjunction with the accompanying drawings wherein.

ABBREVIATIONS

Figure 1:
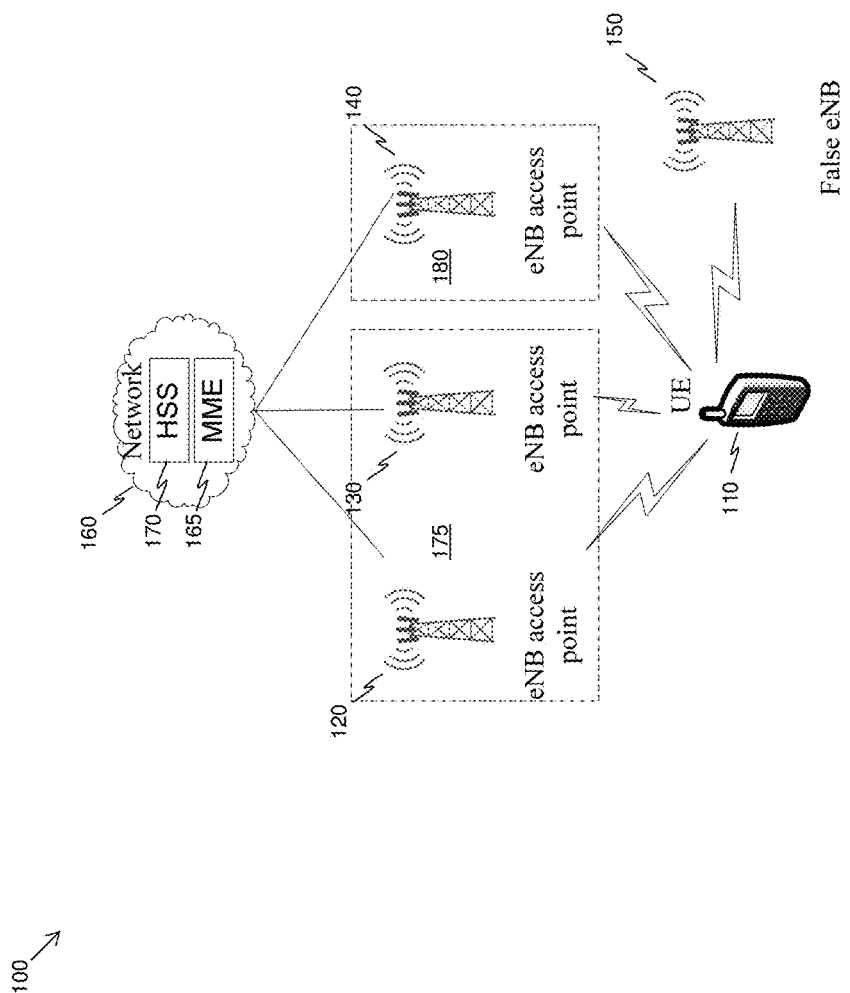
FIG. 1 illustrates an example wireless network, including a user equipment (UE) device, three eNB access points and a false (e.g. malicious) eNB.

Various abbreviations may be used in the following description and are collected here for ease of reference:
3GPP: Third Generation Partnership Project
eNB: eNode B EPS: Evolved Packet System
EMM: EPS Mobility Management
IMSI: International Mobile Subscriber Identity
IMEI: International Mobile Equipment Identity
GUTI: Globally Unique Temporary Identifier
GSM: Global System for Mobile Communications
HSS: Home Subscriber Server
LTE: Long Term Evolution
ME: Mobile Equipment
MME: Mobility Management Entity
PLMN: Public Land Mobile Network
RAN: Radio Access Network
SID: Subscription Identification
TA: Tracking Area
TMSI: Temporary Mobile Subscriber Identity
UE: User Equipment
UMTS: Universal Mobile Telecommunications System
UTRAN: UMTS Terrestrial Radio Access Network

DETAILED DESCRIPTION

Various embodiments are now described with reference to the drawings, wherein like reference numbers are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

A false, e.g. malicious, eNode B (eNB) base station can present itself as a valid base station to a UE device and lure the UE to connect to the false eNB. For example, the false eNB may identify itself as a normal eNB belonging to an advertised Public Land Mobile Network (PLMN) ID. Such actions by the false eNB may be referred to herein as "a spoofing attack", more simply "spoofing" or similar. A spoofing attack may generally describe a situation in which one person or program successfully masquerades as another by falsifying data and thereby gaining an illegitimate advantage. In the present context the false eNB attempts to gain an advantage over the eNB by presenting itself as a legitimate eNB.

The UE typically tries to attach to a serving Radio Access Network (RAN) via the eNB for services using its subscription identification (SID), such as an International Mobile Subscriber Identity (IMSI) or a Temporary Mobile Subscriber Identity (TMSI). This eNB may be referred to herein as an "initial" eNB, which may or may not be a legitimate eNB. The RAN includes a Mobility Management Entity (MME) that, using the provided SID in a legitimate attach transaction, may retrieve from a Home Subscriber Server (HSS) an authentication vector and authorization to serve the attaching UE. If the UE subscription is determined to be valid and authorized, the MME proceeds to authenticate the UE, including verifying whether the UE possess claimed subscription keys. If the authentication is successful, both the UE and the serving network establish a secure session.

In some cases it is possible that the RAN may fail to connect to the HSS or to obtain the authorization vector to authenticate the UE, may receive an authorization rejection, or may not be able to provide services for some other different reason. In such conditions, the MME responds to the UE with appropriate error codes, sometimes referred to as EPS Mobility Management (EMM) cause values or EMM error codes. Some EMM cause values may cause the UE to effectively lock itself out of further attach attempts. Such EMM cause values may be referred to herein as lockout codes. The locked state of the UE may persist until the UE is reset, e.g. by cycling power. A false eNB may exploit this mode of operation to cause one or more UEs within range of the false eNB to lock, possibly compromising the ability of users to communicate, and possibly impacting public safety.

Various embodiments may prevent such spoofing by the false eNB by configuring the UE to ignore a lockout code unless the lockout code is confirmed by a second different (confirming) eNB. In some embodiments the second eNB must be located in a different tracking area than the initial eNB. Only if the lockout code is confirmed by the second eNB will the UE lock itself out of further attempts to attach to the RAN.

FIG. 1 illustrates a network 100 that includes a UE 110, three eNBs 120, 130 and 140, and a network 160, e.g. a UTRAN. The network 160 may be configured to serve an evolved packet core (EPC) network and/or a Global System for Mobile Communications (GSM) and/or Universal Mobile Telecommunications System (UMTS) network. The network 160 may include various components, e.g. an MME 165 and an HSS 170. The eNBs 120 and 130 are shown as sharing a same tracking area 175, and the eNB 140 is shown in a second different tracking area 180. Those skilled in the pertinent art will recognize that a tracking area (TA) is a geographical or logical area that typically includes multiple neighboring cells. The TA may be used, e.g. to track a UE that is in idle mode at a larger granularity than the cell level.

FIG. 1 also includes a false eNB 150. The false eNB 150 may be an electronic device of any configuration that may mimic the operation of a legitimate eNB, such as any of the eNBs 120, 130, 140, when the UE 110 attempts to attach to the network 160. The false eNB 150 may be deployed by a malicious entity to disrupt wireless communications in a local area, e.g. as a prank or as a criminal act. While such disruption may be temporary, and not cause any physical damage to any of the actors communicating via the network 160, the disruption could, e.g. cause economic disruption or interfere with law enforcement or emergency services responses.

More specifically, the false eNB 150 may present itself with a PLMN ID belonging to a valid operator and a radio signal that is locally stronger than the nearest legitimate eNB. The UE 110 may therefore recognize the false eNB as a legitimate eNB and direct an attach request message to the false eNB 150. The false eNB 150 may then return an EMM error code that causes the UE 110 to enter a locked mode, even though the eNB may possess a valid network subscription. The messages carrying these codes cannot be signed by the network to prove their validity, because they are sent before authentication commences, and therefore no security association exists yet between the UE and the serving system. Thus, current 3GPP technical standards fail to guard against such an attack.

Figure 2:
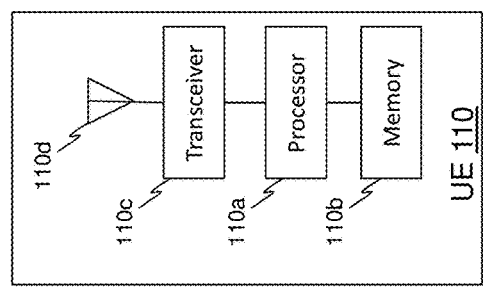
FIG. 2 illustrates an embodiment of a UE device configured according to various embodiments, e.g. such as to operate in the wireless network of FIG. 1.

FIG. 2 illustrates a high-level schematic view of the UE 110 of FIG. 1. The UE 110 may be or include any device configured to communicate with a wireless communication network conforming generally to standards that collectively define a 3GPP Long Term Evolution (LTE) network. For example, the UE 110 may be implemented as a mobile phone, smart phone, tablet computer, laptop computer, or a separate unit (e.g. a "wireless dongle") that may be mated to such devices to confer 3GPP LTE communication capability. The UE 110 includes a processor 110a configured to communicate locally with a memory 110b and a transceiver 110c. By "communicate locally", it is meant that the processor 110a is configured to communicate with the memory 110b and the transceiver 110c by direct, ohmic connections, e.g. wires, circuit boards the like, without an air gap. The transceiver 110c is further coupled to an antenna 110d. The memory 110b includes instructions, e.g. a program, that when executed by the processor 110a configure the processor 110a to perform various actions as described in embodiments herein. The processor 110a communicates with the transceiver 110c to send and/or receive messages and/or packet data to an eNB, e.g. any of the eNBs 120, 130 and 140 of FIG. 1.

Figure 3:
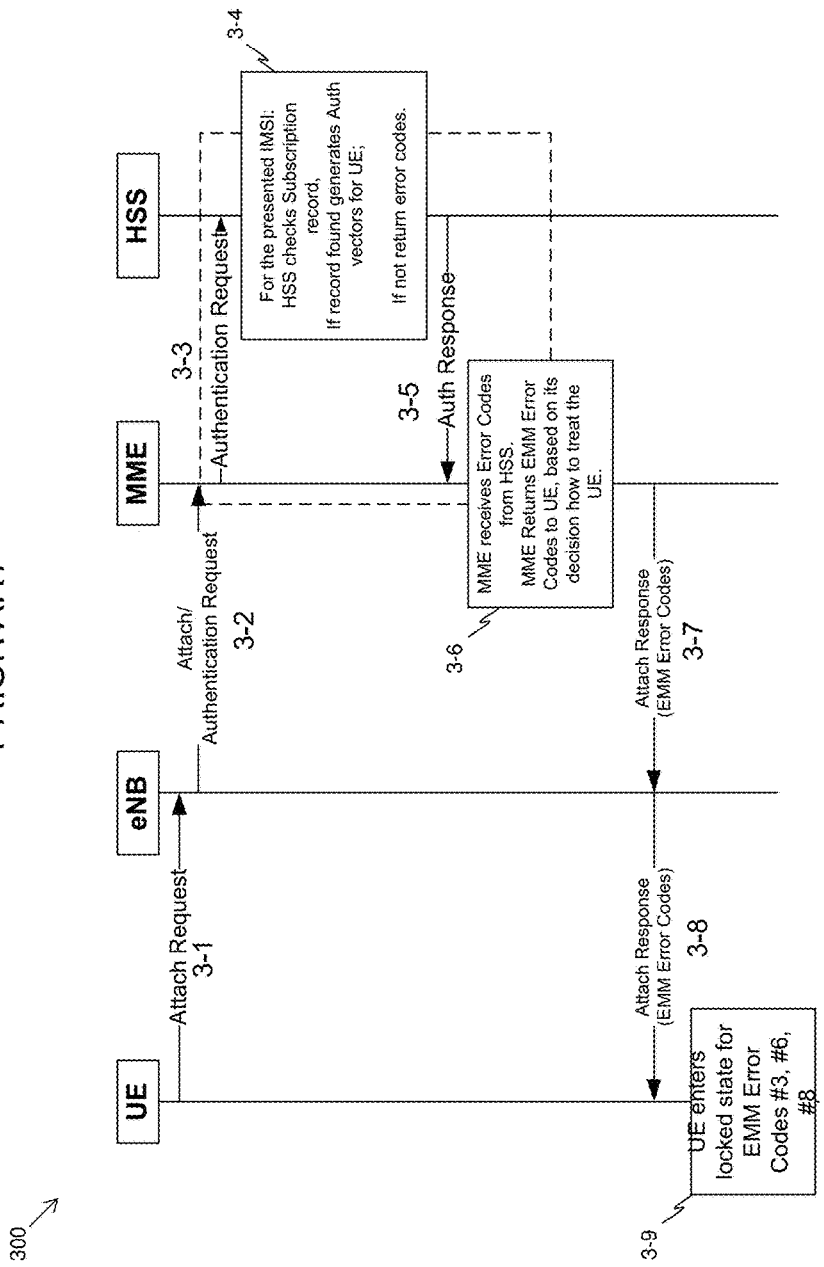
FIG. 3 illustrates prior art operation of a UE, eNB, a mobility management entity (MME), and a home subscriber server (HSS)

FIG. 3 illustrates a conventional method 300 by which a UE may attempt to authenticate to a RAN via an eNB, MME and HSS. In the illustrated embodiment the request for access by the UE is rejected. In a first step 3-1, the UE sends an attached request message to an eNB with which the UE has established unsecure communication with for the purpose of obtaining secure access to a RAN. In a step 3-2, the eNB forwards the attach request to the MME. The MME in a step 3-3 attempts to authenticate the eNB by forwarding identity credentials provided by the eNB to the HSS. Such credentials may include, e.g., an IMSI, an IMEI or Globally Unique Temporary Identifier (GUTI). In a step 3-4 the HSS accesses a subscription record for the provided identity credential and determine an associated valid subscription. If a valid record is obtained, the HSS then generates valid authorization (Auth) vectors for the UE and return these to the MME in a step 3-5. The steps 3-3 through 3-5 are typical of some conventional implementations, but may be omitted in some cases. If, for one of several reasons described in relevant standards, the HSS returns an EMM error code, the HSS instead returns this code to the MME in the step 3-5. (See, e.g. 3GPP TS 24.301, incorporated herein by reference.) In the illustrated example in which an EMM error code is returned by the HSS, the MME then in a step 3-6 determines the appropriate treatment of the UE based on the response, and then in a step 3-7 directs to the eNB an attach response, including the EMM error code. The eNB then directs the attach response, including the EMM error code, to the UE in a step 3-8. In a step 3-9 the UE enters a locked state as previously described when the EMM error code is one of several specified in 3GPP TS 24.301. For example, this standard provides three "locking codes". A code #3 indicates the UE is an "illegal UE"; a code #6 indicates "illegal ME" (where ME refers to "mobile equipment"); and a code #8 indicates "EPS services and non-EPS services not allowed".

Figure 4:
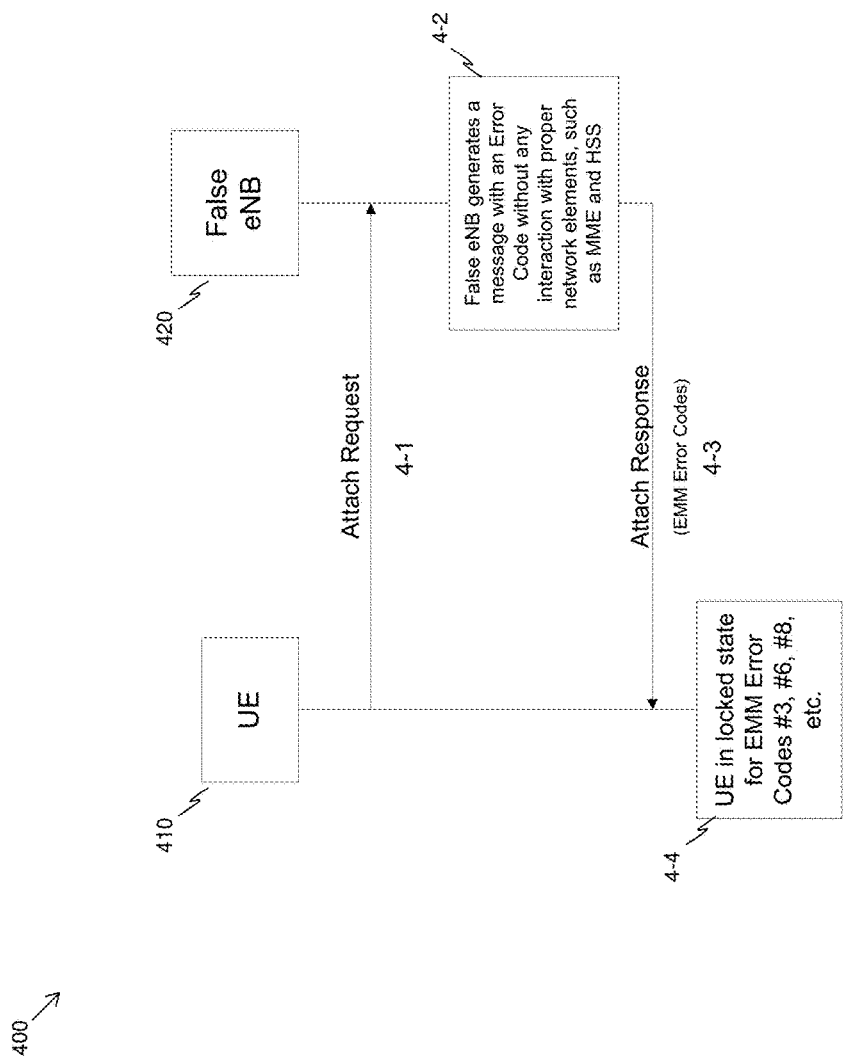
FIG. 4 illustrates an example of how a false (e.g. malicious) eNB may operate to cause a conventional UE to lock after attempting to attach to the false eNB.

FIG. 4 illustrates a scenario in which a false, e.g. malicious, eNB 420 may spoof a conventional UE 410, e.g. by mimicking a legitimate eNB. In a step 4-1 the UE 410 directs an attach request to the false eNB 420. In a step 4-2 the false eNB 420 generates a message including an EMM error code to be directed to the UE 410. The EMM error code may be, e.g., a locking code. The false eNB 420 need not, and in the illustrated example, does not interact with any of the proper network elements ordinarily involved in authenticating the UE. The false eNB 420 returns, in a step 4-4, an attach response that includes an EMM error code, such as a locking code as described above. The UE 410 then enters a locked state in response to the locking code. Notably, the false eNB 420 only needs to possess sufficient resources to communicate with the UE 410 and return the EMM error code. Thus, it can be smaller, and use less power than a legitimate eNB, and may thus be deployed by a malicious actor with little notice. Note also that depending on the type of identity provided by the UE 410 in the attach request, the false eNB 420 may direct an attack against one or more select groups of UEs operating within range of the false eNB 420.

Figure 5:
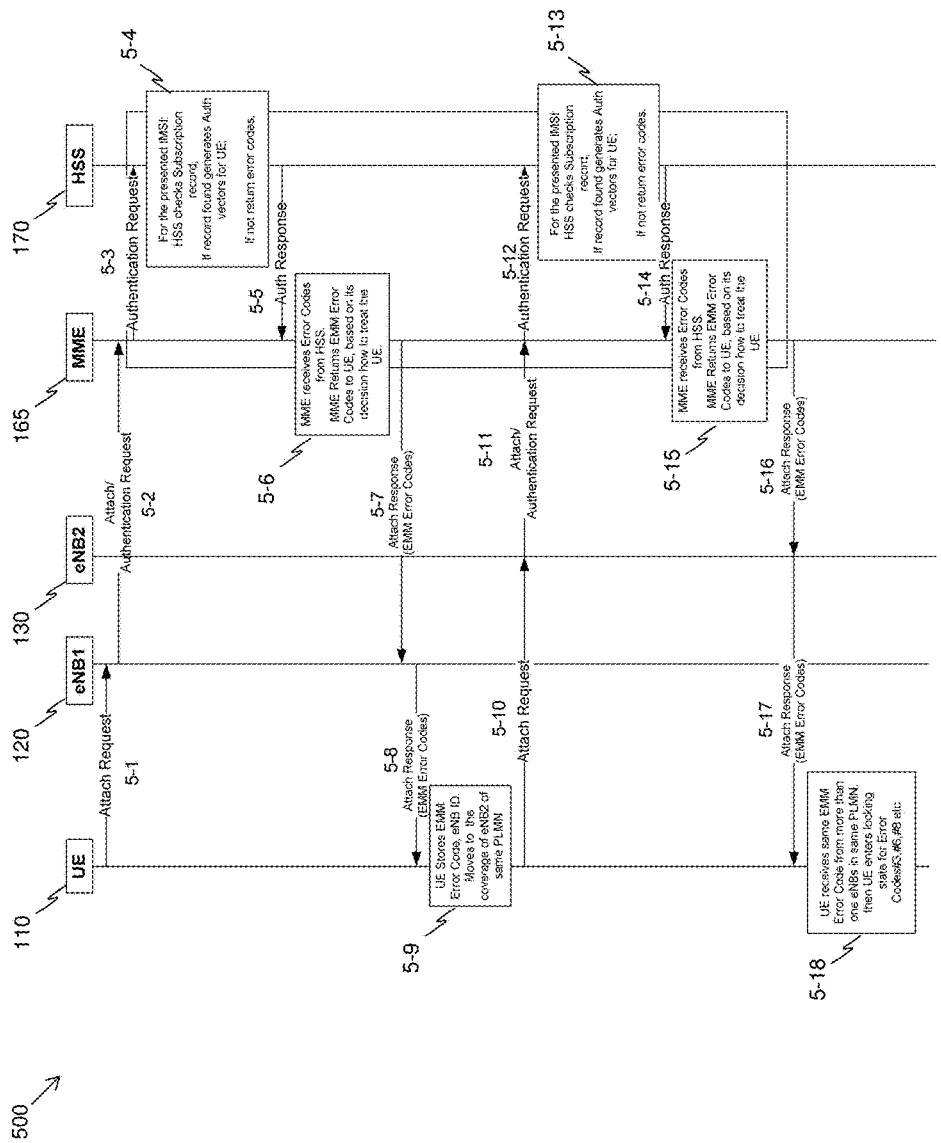
FIG. 5 illustrates an embodiment of operation of the UE of FIG. 2 according to various embodiments to interact with components of a UMTS Terrestrial Radio Access Network (UTRAN), e.g. to prevent spoofing of the UE by a malicious eNB.

FIG. 5 illustrates a method 500, according to various embodiments, that an eNB may employ to defeat the aforementioned risks presented by a false eNB. This figure refers without limitation to the UE 110, eNB 120 (eNB1), eNB 130 (eNB2), MME 165 and HSS 170 of FIG. 1. The eNB 120 and eNB 130 share a same PLMN ID. As will be discussed below in the context of FIG. 6, the eNB 130 may be replaced by the eNB 140 in some embodiments.

In the method 500 the first eight steps of the method 500, 5-1 through 5-8, are directly analogous to the steps 3-1 through 3-8 of the method 300. Thus the steps 5-1 through 5-8 may, but need not, be conventional. For example these steps may conform to any future revision of the applicable 3GPP standards. The transactions shown between the MME 165 and HSS 170, e.g. steps 5-3 though 5-6 and step 5-12 through 5-15, are shown as an example, but may be omitted in some embodiments.

In a step 5-9, the behavior of the UE 110 differs from a conventional UE. In the illustrated embodiment the UE 110 stores the EMM error code received in the attach response and the ID of the eNB 120. The UE 110 then moves to the coverage of the second eNB 130 (eNB2). In a step 5-10 the UE 110 repeats the attach procedure with the eNB2 130. Thus steps 5-10, 5-11, 5-12, 5-13, 5-14, 5-15, 5-16 and 5-17 operate as described for respective steps 5-1 through 5-8.

In particular, the UE 110 receives, in the step 5-17, an attach response message that originated from the MME 165 that may include an EMM error code. In a step 5-18 the UE 110 selects a response as determined by the attach response message. In some cases, the attach response does not include an EMM error code, and the UE 110 completes the attachment to the network. In some other cases, the attach response includes a same EMM error code as was received and stored by the UE 110 in the step 5-9. In this case the UE 110 may determine that a valid lock condition exists and if so enters the lock state. In yet some other cases, the attach response includes a different EMM error code than was received and stored by the UE 110 in the step 5-9. In this case the UE 110 may be optionally configured to disregard the second EMM error code, repeat the attach procedure with the eNB 120, repeat the attach procedure with a third eNB that shares the same PLMN ID, or enter a locked state. In some embodiments, as described further below, the third eNB may be in a different tracking area, e.g. the tracking area 180, than the eNBs 120, 130.

Figure 6:
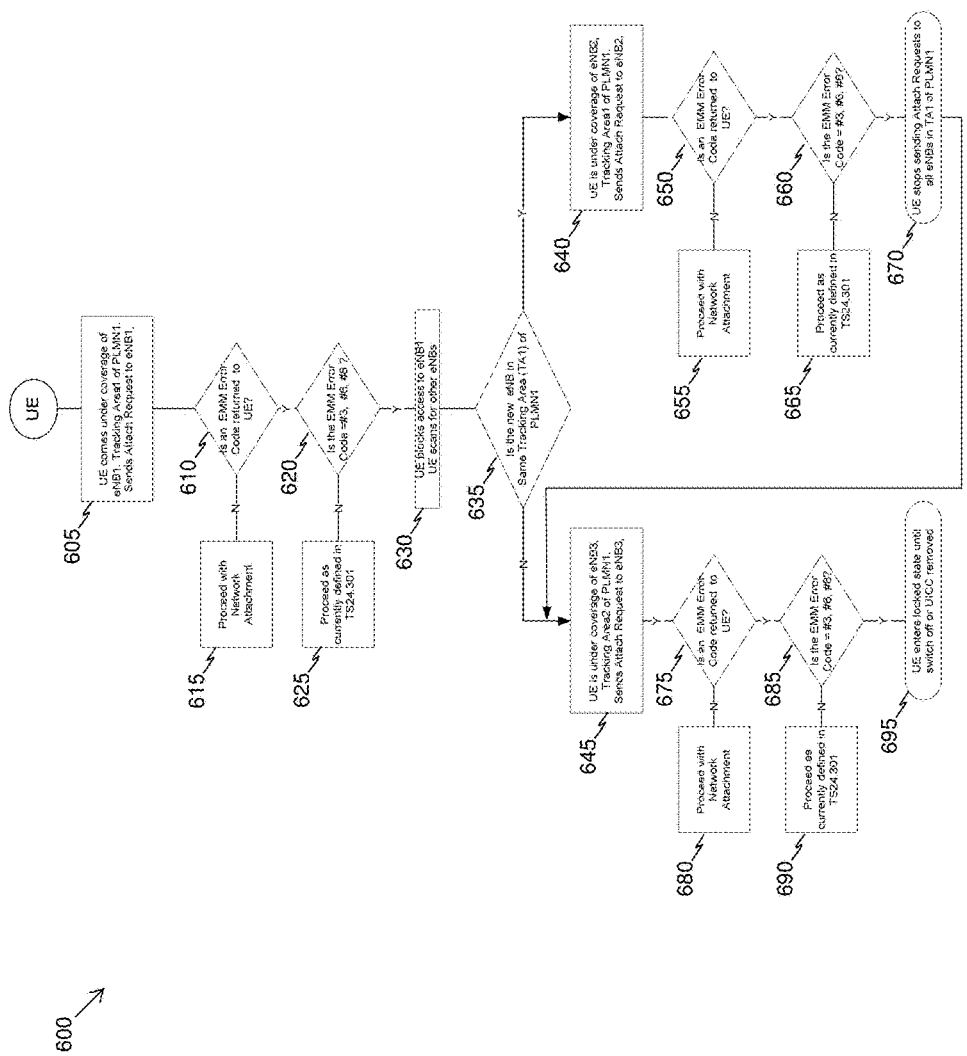
FIG. 6 illustrates an operational flowchart of a UE device, e.g. the UE of FIG. 2, configured according to various embodiments, to prevent spoofing of the UE by a malicious eNB.

FIG. 6 illustrates in the form of a flow chart a method 600 of operation of an apparatus, e.g. the UE 110. FIG. 6 is described without limitation with reference to the components of FIG. 1, while recognizing that a real-world wireless communication network is typically more topologically complex and includes numerous UEs and eNBs. Also, while the method 600 is described with respect to 3GPP LTE, the method 600 may be applicable to future wireless telecommunications standards, e.g. the so-called 5G, or $5^{th}$ generation, wireless standard. The method 600 may be executed by the processor 110a as determined by instructions retrieved from the memory 110b. In a first step 605 the UE initially comes under the coverage of a first eNB, e.g. the eNB 120. The first eNB is located in a first tracking area, e.g. the tracking area 175, associated with a PLMN ID. Upon recognizing the eNB, the UE sends an attach request message to the eNB 120. This action is analogous to the step 5-1 (FIG. 5). In a step 610, the UE 110 determines if an attach response message received in response to the attach request message includes an EMM error code. If not, the method branches to a step 615 and completes the network attach procedure as defined by applicable 3GPP LTE standards. If in the step 610 an EMM error code is detected, the method proceeds to a step 620. In this step the UE 110 determines if the received EMM error code is a locking code. If not, the method branches to a step 625 in which the UE 110 proceeds as specified in applicable 3GPP LTE standards, e.g. TS 24.301. If instead a locking code is detected, the UE 110 in a step 630 blocks access to the first eNB, e.g. the eNB 120, and scans for another eNB. Once a second eNB, e.g. the eNB 130, is detected, the method advances to a step 635, in which the UE 110 determines if the second eNB is in a same first tracking area associated with the PLMN ID as the first eNB. An example of such a case is provided in FIG. 1, in which the eNB 120 and eNB 130 are located in the same tracking area 175. In this case the method branches to a step 640. In the step 640, the UE 110 sends an attach request message to the second eNB, e.g. the eNB 130. This step is analogous to the step 5-10 in FIG. 5.

The steps 640, 650, 655, 660 and 665 are as described for respective steps 605, 610, 615, 620 and 625. In a step 670, reached if the UE 110 detects a locking code in the step 660, the UE 110 stops sending attach request messages to all eNBs within the first tracking area, e.g. tracking area 175. Optionally, the method 600 only advances to the step 670 if the locking code detected in the step 660 is the same as the locking code detected in the step 620. After the step 670 the method 600 advances to a step 645.

The step 645, which may also be reached by a branch from the step 635, initiates an attach procedure with a third eNB, e.g. the eNB 140, that is located in a second tracking area, e.g. the tracking area 180, of the PLMN ID. The method 600 then executes steps 675, 680, 685 and 690, which are as described for respective steps 650, 655, 660 and 665. In a step 695, reached if the UE 110 detects a locking code in the step 685, the UE 110 enters a lock state. Optionally, the method 600 only advances to the step 695 if the locking code detected in the step 685 is the same as the locking code detected in the step 620 and/or 660.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, in conjunction with the appropriate computer hardware, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising: a memory; and
a processor configured to execute instructions stored in said memory that when executed configure the processor to:
receive a first evolved packet system (EPS) mobility management (EMM) attach reject message in response to an attempt to attach to a radio access network (RAN) from an eNode B (eNB) in a first tracking area;
on the condition that said first attach reject message includes a first EMM error code, direct an attach request to a confirming eNB in a second tracking area;
receive a second attach reject message from said confirming eNB; and
on the condition that said second attach reject message includes a second EMM error code, compare the first EMM error code to the second EMM error code, and determine whether to enter a lock state based on whether or not the comparison indicates that the first and second EMM error codes are the same error code.

2. The apparatus as recited in claim 1, wherein said first EMM error code includes one of EMM cause values #3 (Illegal UE), #6 (Illegal ME) and #8 (EPS services and non-EPS services not allowed).

3. The apparatus as recited in claim 1, wherein said first and second EMM error codes both include one of EMM cause values #3 (Illegal UE), #6 (Illegal ME) and #8 (EPS services and non-EPS services not allowed).

4. The apparatus as recited in claim 3, wherein said first and second EMM error codes are a same error code.

5. The apparatus as recited in claim 1, wherein said processor is further configured to:
after receiving said first EMM error code, block access to the eNB from which said first EMM error code was received.

6. The apparatus as recited in claim 1, wherein said processor is further configured to:
stop sending attach requests to all eNBs in the first tracking area that includes the eNB from which said first EMM error code was received.

7. The apparatus as recited in claim 6, wherein said confirming eNB is a first confirming eNB, and said processor is further configured to, after stopping sending messages to all eNBs in said first tracking area:
direct an attach request to a second confirming eNB.

8. The apparatus as recited in claim 1, wherein said confirming eNB is a first confirming eNB, and said processor is further configured to:
direct an attach request to a second confirming eNB; and
on the condition that an attach reject message received from said second confirming eNB includes an EMM error code, enter a lock state.

9. A method comprising:
receiving, at user equipment, a first evolved packet system (EPS) mobility management (EMM) attach reject message in response to an attempt to attach to a radio access network (RAN) from an eNode B (eNB) in a first tracking area;
on the condition that said attach reject message includes a first EMM error code,
directing, from the user equipment, an attach request to a confirming eNB in a second tracking area;
receiving, at the user equipment, a second attach reject message from said confirming eNB;
on the condition that said second attach reject message includes a second EMM error code, comparing the first EMM error code to the second EMM error code, and determining whether to enter a lock state based on whether or not the comparison indicates that the first and second EMM error codes are the same error code.

10. The method as recited in claim 9, wherein said first EMM error code includes one of EMM cause values #3 (Illegal UE), #6 (Illegal ME) and #8 (EPS services and non-EPS services not allowed).

11. The method as recited in claim 9, wherein said first and second EMM error codes both include one of EMM cause values #3 (Illegal UE), #6 (Illegal ME) and #8 (EPS services and non-EPS services not allowed).

12. The method as recited in claim 9, further comprising:
after receiving said first EMM error code at the user equipment, blocking access to the eNB from which said first EMM error code was received.

13. The method as recited in claim 9, further comprising stopping the sending of attach requests to all eNBs in the first tracking area that includes the eNB from which said first EMM error code was received.

14. The method as recited in claim 13, wherein said confirming eNB is a first confirming eNB, the method further comprising configuring said processor to, after stopping sending messages to all eNBs in said first tracking area; and
directing an attach request to a second confirming eNB.

15. The method as recited in claim 9:
directing an attach request to a second confirming eNB; and
on the condition that an attach reject message received from said second confirming eNB includes an EMM error code, enter a lock state.

16. The method as recited in claim 15, wherein said second confirming eNB is in a different tracking area that said first confirming eNB.

* * * * *